April 14, 1970     D. KELLERMAN     3,506,895
CAPACITOR ARRANGEMENT AND METHOD OF MAKING SAME
Filed Dec. 6, 1965     2 Sheets-Sheet 1

INVENTOR.
DAVID KELLERMAN
BY
Don Finkelstein
ATTORNEY

INVENTOR.
DAVID KELLERMAN
BY
Don Finkelstein
ATTORNEY

United States Patent Office 3,506,895
Patented Apr. 14, 1970

3,506,895
CAPACITOR ARRANGEMENT AND METHOD OF MAKING SAME
David Kellerman, 1485 S. Cardiff,
Los Angeles, Calif. 90035
Filed Dec. 6, 1965, Ser. No. 511,914
Int. Cl. H01g 1/00, 13/00
U.S. Cl. 317—261                    10 Claims

ABSTRACT OF THE DISCLOSURE

There is disclosed herein an improved method of manufacturing a wound capacitor and improved capacitor manufactured according to this method. As disclosed, a thin wall dielectric cylinder having a comparatively large diameter is placed upon a means for rotating the cylinder about the axis of the cylinder. During the rotation, a first plurality and a second plurality of electrically conductive layers are wound upon the cylinder with a plurality of dielectric layers intermediate each of the electrically conductive layers, upon the outside peripheral surface of the cylinder. When sufficient number of layers has been built up, the cylinder is removed from the rotation means and cut into individual sections. The cylinder may be provided with score lines to aid in the fracture of the cylinder at predetermined points. Each of the individual segments then comprises a wafer-like capacitor which may be provided with appropriate end connections to allow utilization in electric circuitry.

---

This invention relates to the capacitor art and more particularly to an improved arrangement for simultaneously fabricating a plurality of capacitors.

In many applications it is desired to utilize wafer type capacitors. That is, capacitors that are generally rectanglar in cross section as opposed to cylindrical capacitors. Such wafer type capacitors often provide better stacking and higher space utilization when incorporated into a completed circuit than do the more conventional cylindrical capacitors.

One fabrication technique for manufacturing capacitors is a process known as winding wherein a plurality of electrically conductive layers are alternately wound with dielectric layers around a suitable substrate. This winding technique is, of course, widely used in providing cylindrical, wound, capacitors, but, to the best of applicant's knowledge, has not been heretofore available in providing rectilinear wafer type capacitors.

Accordingly, it is an object of applicant's invention herein to provide a wound wafer type capacitor.

It is another object of applicant's invention herein to provide a method for simultaneously winding a plurality of wafer type capacitors.

It is yet another object of applicant's invention herein to provide an improved wafer type capacitor and method for making same that is adaptable to high production techniques.

The improved method for making a plurality of wound wafer type capacitors, according to one aspect of applicant's invention herein, comprises providing a comparatively thin walled dielectric cylinder having a comparatively large diameter, for example, on the order of one or two feet. The thickness of the dielectric wall is comparatively thin: that is, it may be on the order of $\frac{1}{32}$ to $\frac{1}{64}$ of an inch, and, as noted above, the diameter may be on the order of one or two feet. The cylinder forms the dielectric substrate for the plurality of capacitors manufacured according to applicant's improved method. The dielectric cylinder may, if desired, have a plurality of axially oriented score lines on the external surface thereof and, if such score lines be present, is adapted to be frangible along these score lines.

The dielectric cylinder is rotated about its axis and a first plurality of electrically conductive layers and a second plurality of electrically conductive layers are alternately wound on the cylinder, during the rotation of the cylinder, with a plurality of dielectric layers intermediate each of the electrically conductive layers so that there is provided electrical insulation between each of the first plurality and the second plurality of electricallly conductive layers. These layers are wound on the outside surface of the dielectric cylinder.

In one embodiment of the applicant's invention, the electrically conductive layers comprise segmented vacuum deposited metallic layers on a dielectric layer. In other embodiments of applicant's invention, the electrically conductive layers and the dielectric layers are separately wound. In either event, in the preferred embodiment of applicant's invention, the first plurality of electrically conductive layers has end surfaces substantially coplanar with a first peripheral edge portion of the dielectric cylinder and the corresponding end surfaces of the second plurality of electrically conductive layers are axially spaced inwardly therefrom. Similarly, the second plurality of electrically conductive layers has second end surfaces substantially coplanar with a second peripheral edge portion of the dielectric cylinder opposite the first peripheral edge portion thereof, and the first plurality of electrically conductive layers has corresponding second end surfaces axially inwardly spaced therefrom.

After a preselected number of layers have been wound upon the dielectric cylinder, each peripheral edge portion thereof is coated with an electrically conductive material, for example by metal spraying, to provide a substantially continuous electrically conductive coating along the first end surface of the first plurality of electrically conductive layers, and the second end surface of the second plurality of electrically conductive layers to define thereby first and second capacitor electrodes, respectively. Leads may then be applied to each of the capacitor electrodes on the coated end surfaces. The dielectric cylinder and the windings thereon may then be divided by, for example, cutting through the wound layers and fracturing the cylinder intermediate the segments defining the capacitor electrodes. The individual discrete capacitors thus provided after dividing may have their longitudinal edges sealed together by, for example, applying a layer of dielectric tape around the capacitor.

In other embodiments of applicant's invention, the dielectric layers and the dielectric substrate are made heat sealable and a heated knife is utilized to cut through the plurality of layers and the dielectric cylinder thereby sealing the dielectric layers to the dielectric cylinder along the score lines.

In other embodiments of applicant's invention, a dielectric cylinder may be replaced by a semi-flexible dielectric belt which may take the form of a conventional endless belt during the winding operation as opposed to the cylindrical form described above, or the dielectric substrate may be in the form of a rectangle, or other desired geometric shape.

Since a comparatively large diameter is utilized for the dielectric cylinder, when it is divided into the plurality of discrete capacitors there is generally very little curvature and the discrete capacitors may be considered essentially rectilinear. Thus, for example, if the desired capacitors are on the order of ¼ of an inch wide, there will be produced from a one foot diameter dielectric cylinder approximately 150 capacitors simultaneously according to the method described above. For such a size, of course, each capacitor would represent approximately a little more than two degrees of arc of the original cylinder and the cord rise therein is negligible.

The above and other embodiments may be more fully understood from the following detailed description taken together with the accompanying drawing wherein similar reference characters refer to similar elements throughout and in which.

Figure 1:
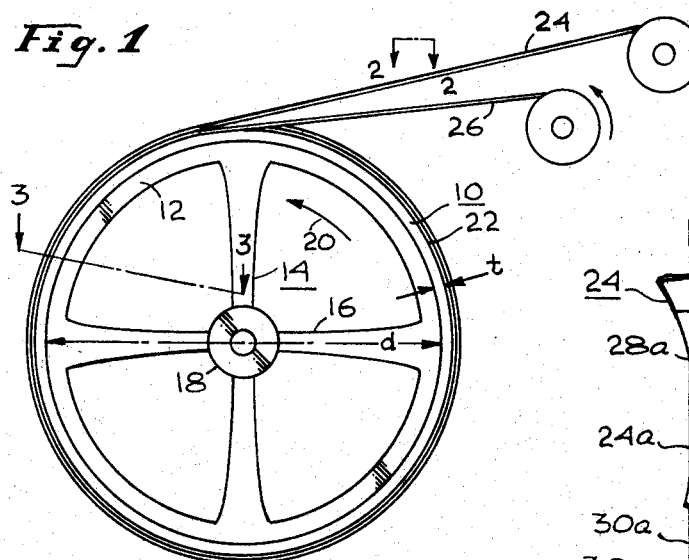
FIGURE 1 is a schematic representation of the manufacture of a plurality of capacitors simultaneously according to one embodiment of applicant's invention.

Referring now to FIGURE 1, there is shown the schematic representation of the winding of a plurality of wafer type capacitors according to one embodiment of applicant's invention herein. As shown on FIGURE 1, there is provided a dielectric substrate 10 which, in this embodiment of applicant's invention, is in the form of a thin walled cylinder having a comparatively large diameter. For example, the wall thickness indicated by the letter $t$ on FIGURE 1 may be on the order of $\frac{1}{16}$ to $\frac{1}{64}$ of an inch, and the diameter $d$ of the cylinder 10 may be on the order of one foot. In this embodiment of applicant's invention, the dielectric cylinder 10 may be considered to be substantially rigid. The dielectric cylinder 10 provides a dielectric substrate for the plurality of discrete capacitors simultaneously manufactured according to applicant's invention herein.

The dielectric cylinder 10 is mounted upon a rim 12 of a wheel 14 having spokes 16 and a hub 18. The wheel 14 may be rotated in a direction indicated by arrow 20.

Figure 2:
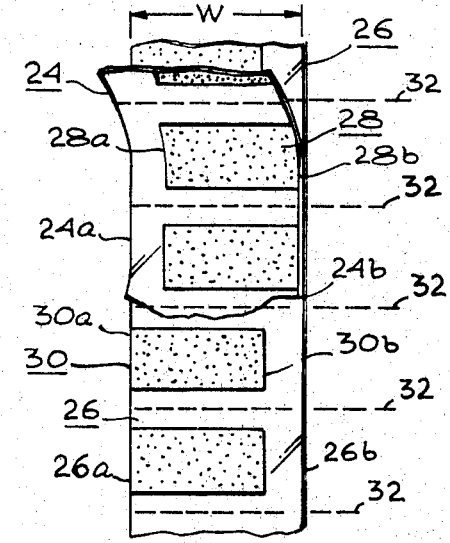
FIGURE 2 is a view along the line 2—2 of FIGURE 1.

As the dielectric cylinder 10 is rotated with the wheel 14 in the direction indicated by the arrow 20, there is wound upon the external surface 22 of the dielectric cylinder 10 layers 24 and 26. As shown in FIGURE 2, layers 24 and 26 comprise flexible dielectric layers upon which have been vacuum deposited a plurality of segmented electrically conductive sections. Thus, on dielectric layer 24 there has previously been vacuum deposited the electrically conductive sections 28 and on dielectric layer 26 there has been vacuum deposited previously electrically conductive sections 30. In this embodiment of applicant's invention, the plurality of electrically conductive sections 28 deposited upon dielectric layer 24 comprise a first electrically conductive layer for the capacitors of applicant's invention herein and the plurality of electrically conductive sections 30 deposited upon dielectric layer 26 comprise the second plurality of dielectric layers of applicant's improved capacitors described herein.

As can be seen from FIGURE 2, the width W of the layers 24 and 26 are preselected to be the same width as the dielectric cylinder 10. That is, the edge portions 24a and 26a correspond and are coplanar with a first peripheral edge of the dielectric cylinder 10 and the edge portions 24b and 26b correspond and are coplanar with a second peripheral edge of the dielectric cylinder 10. The electrically conductive segments 30 have a first end surface 30a coplanar with the edge 26a and a second end surface 30b spaced inwardly from the edge 26b. Similarly, the electrically conductive segments 28 deposited on dielectric layer 24 have a second end surface 28b coplanar with the edge 24b and a first end surface 28a spaced inwardly from the edge 24a. The spacing between the electrically conductive segments 28 and between the electrically conductive segments 30 is the same and the layers 24 and 26 upon which the electrically conductive segments are deposited are wound so that the electrically conductive segments 28 will lie over the electrically conductive layers 30, and the median line indicated by dotted lines 32 between adjacent segments will fall in a radial plane when wound upon the dielectric cylinder 10. Because of the comparatively large radius of the dielectric 10 there is comparatively little difference in the coplanar alignment of the median lines 32 even though a large number of layers are wound.

After the desired number of layers 24 and 26 have been wound upon the dielectric cylinder 10, the winding may be stopped by, for example, stopping the rotation of the wheel 14. The peripheral edges 24a and 26a, and 24b and 26b may be coated with an electrically conductive coating. This may take the form of, for example, solder dipping, metal spraying, or the like.

Figure 3:
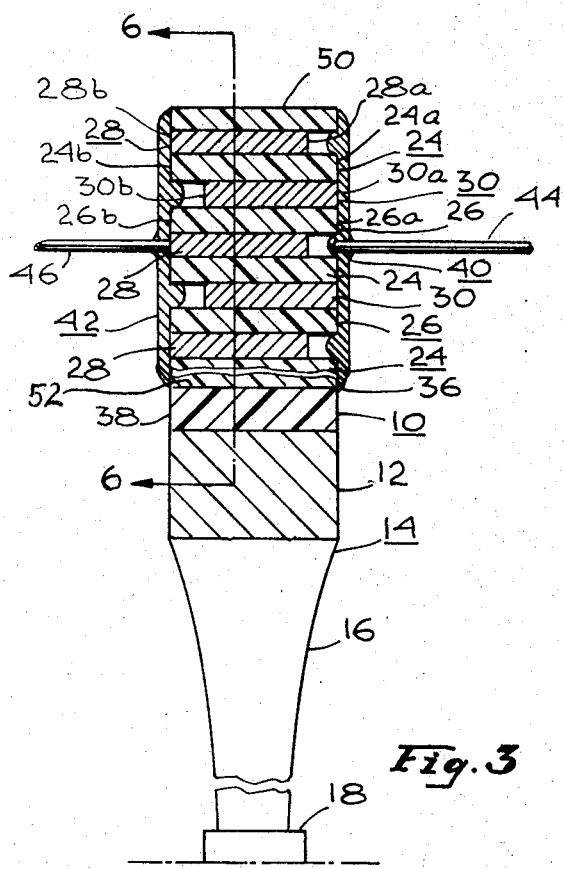
FIGURE 3 is a sectional view along the line 3—3 of FIGURE 1.

FIGURE 3 illustrates a sectional view through the dielectric cylinder and wheel shown on FIGURE 1 after the coating operation. As shown on FIGURE 3, an electrically conductive coating which in this embodiment of applicant's invention may be considered to be solder from a metal spraying operation is generally designated 40 and has been applied along peripheral edge 36 of the dielectric substrate 10 and layers 24 and 26. Since the layers 28 are set back from the peripheral edge 36, electrical continuity is provided between the electrically conductive segments 30 which are thereby joined together along their first end surface 30a by the electrically conductive coating 40 and the set back, axially inwardly spaced first end surface 28a is spaced from the first electrically conductive coating 40 so that there is no electrical contact therebetween.

Similarly, a second electrically conductive coating 42 is applied along peripheral edge 38 of the dielectric cylinder 10 to provide electrical continuity between the second end surfaces 28b of the electrically conductive segments 28. The electrically conductive layer 42 does not contact the second end surface 30b of the electrically conductive layers 30 because of the inward spacing thereof and, consequently, there is no electrical continuity between the layers 30 and the second electrically conductive coating 42.

A first electrical lead 44 may, if desired, be applied to first electrically conductive coating 40 and a second electrical lead 46 may, if desired, be applied to the second electrically conductive coating 42, one such pair of leads for each capacitor. Since, as shown in FIGURE 1, the layers 24 and 26 are being wound on the dielectric cylinder 10 with the electrically conductive segments 28 and 30, respectively, facing outwardly, dielectric tape 50 may be wound around the periphery after the winding of the layers 24 and 26 on the dielectric cylinder 10 to provide an encapsulation and protection of the outermost layer 28a. If the layers 24 and 26 were to be wound with the electrically conductive layers 28 and 30 facing inwardly so that the first electrically conductive segments would be abutting against the outer peripheral surface 52 of the dielectric cylinder 10, then the electrically insulating tape 50 may, if desired, be eliminated.

Figure 4:
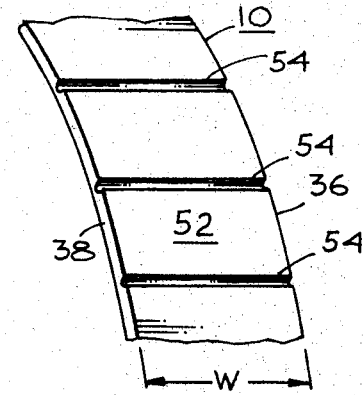
FIGURE 4 is a partial pictorial view of a dielectric cylinder useful in the practice of applicant's invention herein.
Figure 5A:
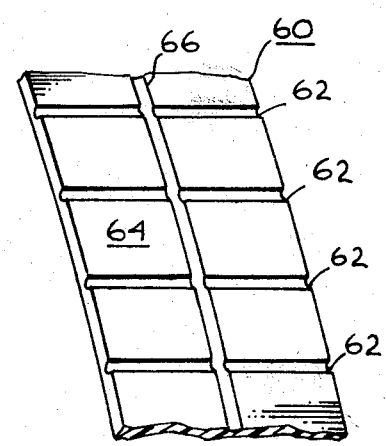
FIGURE 5A is a partial pictorial view of another dielectric substrate useful in the practice of applicant's invention herein.

FIGURE 4 illustrates in pictorial representation a section of the dielectric cylinder 10. As shown on FIGURE 4, the dielectric cylinder 10 may, if desired, be provided with a plurality of thin, axially oriented score lines 54 along the external peripheral surface 52 thereof. The dielectric cylinder 10 is frangible and the score lines 54, if present, provide an aid dividing the cylinder 10, when desired, into the individual capacitor. In a typical application, the width W of the dielecrtic cylinder 10 may be on the order of ¼ of an inch, where a single row of capacitors is simultaneously fabricated. However, where more than one row of capacitors is desired to be fabricated, for example two rows, these may also be fabricated simultaneously according to applicant's invention herein by utilizatiton of a different configuration dielectric cylinder. One such configuration of a dielectric cylinder that may be useful in the practice of applicant's invention herein is shown on FIGURE 5A. As shown thereon, there is a dielectric cylinder 60 that may be provided with a plurality of axial scores 62 along an external surface 64 thereof and, as illustrated on FIGURE 5A, there may also be provided a peripheral score line 66 intersecting each of the axial score lines 62. When such a dielectric cylinder 60 is utilized, it will be appreciated that twice as many individual discrete capacitors are simultaneously fabricated as with the dielectric cylinder 10.

It will be appreciated that the dielectric layer 24 upon which the electrically conductive segments 28 have been deposited is identical to the dielectric layer 26 upon which the electrically conductive layers 30 have been deposited. That is, if the dielectric layer 24 were to be turned end for end it would exactly match the dielectric layer 26.

Figure 5B:
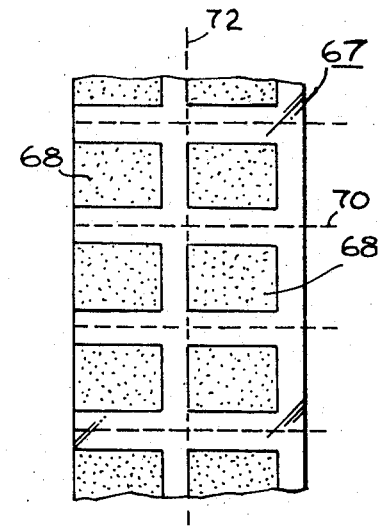
FIGURE 5B is a partial sectional view of a dielectric layer with vacuum deposited segments useful with the substrate of FIGURE 5A.

FIGURE 5B illustrates a dielectric layer 67 upon which have been deposited a plurality of electrically conductive segments 68. Such a dielectric layer 67 may be utilized in winding a plurality of capacitors upon the dielectric cylinder 60 illustrated in FIGURE 5A when two such dielectric layers 67, one turned end for end of the other, are simultaneously wound in a manner similar to that shown in FIGURE 1. The median lines indicated by dotted lines 70 on FIGURE 5B correspond to the score lines 62 on the dielectric cylinder 60 and the peripheral line indicated by dotted line 72 corresponds to the peripheral score line 66.

Figure 6:
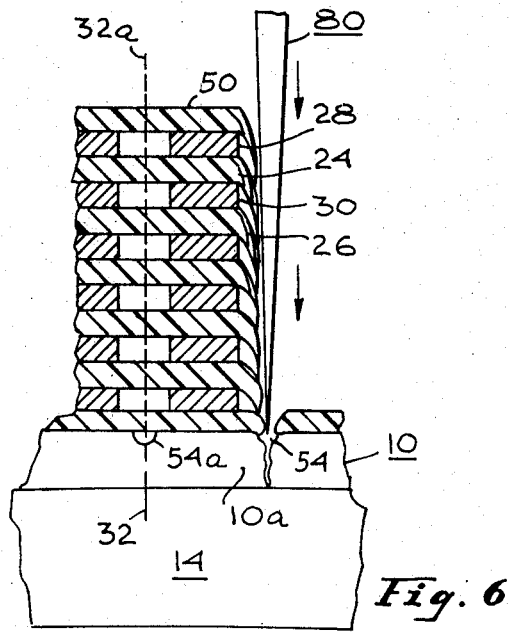
FIGURE 6 is a sectional view along the line 6—6 of FIGURE 3.

After the dielectric cylinder 10 and the windings thereon have been coated along their peripheral edges with an electrically conductive coating and, if desired, a suitable number of leads attached, the entire assembly may, if desired, be separated into the individual capacitors. FIGURE 6 which is a sectional view along the line 6—6 of FIGURE 3, illustrates the step of dividing. As shown on FIGURE 6, a knife 80, or other similar instrument, may be utilized to cut through the layers 24 and 26 along the median lines 32 thereof and then into the dielectric cylinder 10 along, if present, the score lines 54 to cut or otherwise fracture the frangible dielectric cylinder 10.

Since the electrically conductive segments 28 and 30 are spaced from the median lines 32, the knife 80 does not cut through the electrically conductive segments, but rather only through the dielectric layers 24 and 26.

In some embodiments of applicant's invention, it may be desirable to provide that the dielectric layers 24 and 26 be heat sealable. In such an event, the knife 80 may be heated and the dielectric layers will, upon the cutting step, be sealed together and, if the dielectric cylinder 10 is also heat sealable, be sealed thereto to provide an encapsulation of the individual capacitors. When the layers 24 and 26 are cut along the line 32a of FIGURE 9, it can be seen that the electrically conductive cylinder 10 will fracture at the score lines 54a and provide a complete capacitor. This operation is repeated for as many score lines 54 as may be present and thus the plurality of separate and discrete capacitors have been produced according to applicant's invention from the single winding operation illustrated on FIGURE 1. The segments such as segment 10a of the dielectric cylinder 10 that lie between the score lines 54 become the dielectric substrates for the individual capacitors. Since these are substantially rectangular in shape, there has been provided a plurality of wound wafer type capacitors manufactured simultaneously.

Applicant has found that the layers 24 and 26 may be, for example, Mylar, polyethylene, polycarbonate, or the like, on the order of .00025 inch thick. The deposited electrically conductive segments 28 and 30 may be vacuum deposited metal such as aluminum, silver, gold or the like, deposited to a thickness of 10 micro inches. The dielectric cylinder 10, or the dielectric cylinder 60, may be fabricated from a dielectric plastic, glass, or the like. However, where the dielectric layers 24 and 26 are heat sealable, applicant prefers to utilize a heat sealable dielectric cylinder 10 so that substantially complete encapsulation may easily be provided during the above-described dividing step.

In some embodiments of applicant's invention, applicant has found it advantageous to apply the coatings 40 and 42 and then apply the leads 44 and 46 automatically. After the leads are attached, the entire assembly may be vacuum impregnated or injection molded with a thermosetting resin, such as epoxy, silicone, hard wax, or similar dielectric materials. These resins harden on cooling and thus provide a more rigid, fully encapsulated structure. When this step is desired, the coatings 40 and 42 are preferably applied only along the end surfaces of the layers 28 and 60, so that the resin may penetrate and occupy the interior spaces along the longitudinal spaces between the segments 28 and 30.

Further, for decade, delay line or similar applications, it may often be desirable to utilize a semi-flexible or flexible dielectric substrate 10, so that the assembly may be cut in one place and then flattened to provide a strip of capacitors. In such applications, it may also be desirable to have a common electrical connection by, for example, metal spray coating, extending over a plurality of the capacitors on one side thereof with a single lead. It will be appreciated that many other variations of capacitor configurations may also be utilized.

Figure 7A:
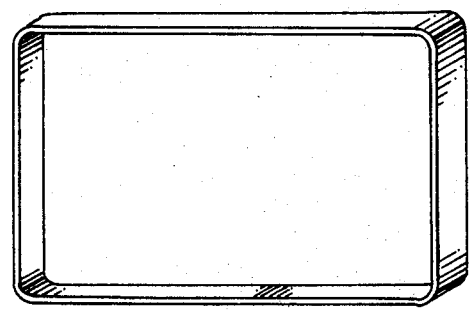
FIGURES 7A and 7B illustrates other dielectric substrates useful in the practice of applicant's invention herein.
Figure 7B:
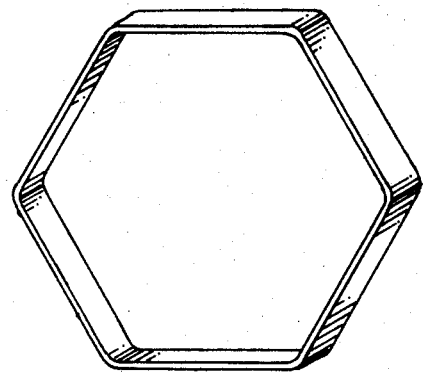

Further, as noted above, the dielectric substrate utilized in applicant's invention herein may, if desired, be geometrical shaped other than cylindrical. Thus, FIG. 7A indicates a rectangular, thin walled dielectric substrate and FIGURE 7B illustrates a hexagonal dielectric substrate. The substrates may be either rigid, semi-flexible or flexible, as desired.

Applicant's improved method herein allows a highly automated production technique for the simultaneous production of a plurality of capacitors.

This concludes the description of applicant's invention of an improved wafer type capacitor and an improved method for fabricating simultaneously a plurality of such wafer type capacitors. It will be appreciated that the particular structure defined herein is critical in the production method described for producing simultaneously a plurality of wound wafer type capacitors according to applicant's invention. Further, it will be appreciated that the specific materials and sizes mentioned above is illustrative only and is not limiting to the scope of applicant's invention. Those skilled in the art may find many variations and adaptations of applicant's invention herein and the following claims are intended to cover all such variations and adaptations falling within the true scope and spirit of applicant's invention.

What is claimed as new and desired to be secured by Letters Patent of the United States is:

1. A method of simultaneously fabricating a plurality of substantially flat, wafer-like, capacitors each of the capacitors of the type having a dielectric substrate and a first plurality of electrically conductive layers defining a first capacitor electrode and a second plurality of electrically conductive layers defining a second capacitor electrode and a plurality of dielectric layers intermediate each of said electrically conductive layers disposed on one outer peripheral surface of said dielectric substrate and comprising the steps of:

rotating a thin wall dielectric substrate cylinder about its axis;

winding said first and said second plurality of electrically conductive layers and said plurality of dielectric layers alternately on one side of said rotating dielectric substrate to provide said first and said second capacitor electrodes electrically insulated from each other;

applying an electrically conductive coating to opposite preselected end surfaces of each of said first and said second capacitor electrodes;

and dividing said thin wall dielectric substrate cylinder and said first and said second capacitor electrodes and said plurality of dielectric layers into a plurality of capacitors.

2. The method according to claim 1 and further including the step of:

dielectrically sealing said plurality of dielectric layers along preselected longitudinal edge portions extending between said opposite preselected peripheral end surfaces.

3. The method defined in claim 2 wherein said step of applying an electrically conductive coating to said opposite preselected peripheral edge portions is metal spraying.

4. The method defined in claim 2 wherein said step of dielectrically sealing comprises the step of vacuum impregnating said capacitors with a dielectric thermosetting plastic.

5. The method defined in claim 2 wherein said dielectric layers and said dielectric substrate are heat sealable and said step of dielectrically sealing said plurality of dielectric layers is the step of applying heat to said dielectric layers and said dielectric substrate to provide a seal therebetween.

6. A capacitor comprising in combination:

successive substantially flat layers of electrically conductive and dielectric material provided with a curved dielectric substrate having a predetermined radius of curvature and bonded to the adjacent dielectric layer.

7. The arrangement defined in claim 6 wherein:

said successive layers of dielectric material are dielectrically sealed together along a first and a second preselected longitudinal edge thereof.

8. The arrangement defined in claim 7 wherein:

said sealed together layers of dielectric material are sealed to said dielectric substrate along said first and said second preselected longitudinal edges.

9. The arrangement defined in claim 8 and further comprising:

a first electrically conductive coating for connecting each of a first plurality of said successive layers of electrically conductive material together in electrically conductive relationship along a first preselected end surface thereof, a second electrically conductive coating for connecting each of a second plurality of said successive layers of electrically conductive material together in electrically conductive relationship along a second preselected end surface thereof, said first and said second preselected end surfaces extend between said first and said second preselected longitudinal surfaces.

10. The arrangement defined in claim 6 wherein:

said dielectric substrate is semiflexible.

References Cited

UNITED STATES PATENTS

| | | | |
|---|---|---|---|
| 2,731,705 | 1/1956 | Grouse | 29—25.42 |
| 2,731,706 | 1/1956 | Grouse | 29—25.42 |
| 2,839,816 | 6/1958 | McGraw | 29—25.42 |
| 3,251,115 | 5/1966 | Pfeiffer | 29—25.42 |

CHARLIE T. MOON, Primary Examiner

R. B. LAZARUS, Assistant Examiner

U.S. Cl. X.R.

29—25.42